United States Patent [19]

Kuyzin

[11] Patent Number: 5,244,931
[45] Date of Patent: Sep. 14, 1993

[54] MIXTURES OF DIBASIC ACID ESTERS AND NONYLPHENOL AS CELL OPENERS IN LOW DENSITY RIGID POLYURETHANES USEFUL IN POUR-BEHIND-FABRIC APPLICATIONS OF LOW DENSITY SRIM

[75] Inventor: Gregg S. Kuyzin, Ypsilanti, Mich.

[73] Assignee: BASF Corporation, Parsippany, N.J.

[21] Appl. No.: 857,151

[22] Filed: Mar. 25, 1992

[51] Int. Cl.$^5$ ............................................. C08G 18/14
[52] U.S. Cl. .................................. 521/114; 521/117; 521/130; 521/172; 521/174; 428/304.4; 428/317.9; 428/423.1
[58] Field of Search ............... 521/114, 117, 130, 172, 521/174; 428/304.4, 317.9, 423.1

[56] References Cited

PUBLICATIONS

George Woods, "The ICI Polyurethanes Handbook", pp. 48–49, 1987.

*Primary Examiner*—Maurice J. Welsh
*Attorney, Agent, or Firm*—Martin P. Connaughton

[57] ABSTRACT

The invention relates to low density cellular, rigid polyurethanes which employ the dimethyl esters of adipic, glutaric and succinic acids and mixtures thereof in conjunction with nonylphenol as cell-opening agents. The use of this ester phenol mixture obviates the need of other surfactants, particularly silicone surfactants which reduce the adhesion of the urethanes to fabrics in pour-behind-fabric applications.

10 Claims, No Drawings

MIXTURES OF DIBASIC ACID ESTERS AND NONYLPHENOL AS CELL OPENERS IN LOW DENSITY RIGID POLYURETHANES USEFUL IN POUR-BEHIND-FABRIC APPLICATIONS OF LOW DENSITY SRIM

BACKGROUND OF THE INVENTION

1. Field of the Invention

The present invention is directed to rigid polyurethanes and pour-behind-fabric, fiber-reinforced applications thereof. Particularly, the present invention pertains to cellular rigid polyurethanes containing aliphatic dibasic acid esters and nonylphenol wherein such polyurethanes are especially useful in low density pour-behind fiber-reinforced reaction-injection-molded systems and the resulting products known as structural-RIM or SRIM.

2. Description of the Related Art

Reaction-injection-molding (RIM) systems by now are well known to those skilled in the art. Commercial systems produce elastomeric products which contain polyurethane-polyurea linkages having many uses. However, such systems have relatively low heat distortion temperatures and lack the flex modulus and tensile strength necessary for many applications. Such systems are disclosed, by way of example, in U.S. Pat. No. 4,218,543.

The flex modulus and tensile strength of traditional RIM systems may be improved through the addition of short fiber reinforcement (RRIM). However, the addition of chopped fibers raises the viscosity of the system components as well as affecting the ease of processing. Moreover, this addition of reinforcement has little effect on matrix-dominated physical properties such as heat distortion temperature (HDT).

The use of woven or non-woven (random) fiber reinforcement (Structural RIM or SRIM) can provide parts with yet greater tensile strength and flex modulus. Furthermore, the physical properties may be made directional through the use of unidirectional fibers or combinations of both unidirectional and random fiber orientations. Unfortunately, the use of such reinforcement has not proven practical with traditional RIM systems due to the high viscosities of such systems.

Alternative systems such as those described in U.S. Pat. Nos. 4,794,129; 4,935,460; and 4,983,659 issued to ICI Americas, Inc. disclose modifications to the reaction system which allow said systems' chemical reactivities to be tailored to a particular need.

In addition to the formulation characteristics, low density pour-behind-fabric SRIM applications also require open-celled compositions, which generally necessitates the use of a cell-opening additive. Unfortunately, use of conventional cell openers, particularly silicone-containing surfactants, reduce the adhesion of the urethane to fabric in pour-behind-fabric applications and are therefore commercially unacceptable. Co-pending U.S. application 756,244 discloses the use of dibasic esters in rigid polyurethane foams. "The ICI Polyurethanes Handbook," 1987 p.48, discloses the use of a substituted nonylphenol used as a surfactant.

SUMMARY OF THE INVENTION

According to the present invention, it has been found that a dibasic acid ester (DBE) selected from the group comprising dimethylesters of adipic acid, glutaric acid, succinic acid, and mixtures thereof, and nonylphenol added to a polyurethane formulation, function effectively as a cell-opening agent without affecting the adhesion between the polyurethane substrate and the surfacing film or fabric. For the purposes of the present invention, it is understood that the polyurethane formulations also contain polyisocyanurate linkages. Furthermore, DBEs are low viscosity materials that when added to conventional urethane systems, reduce viscosity and improve the flow of the resulting urethane formulation through reinforcing materials, thereby obviating the need for chemical modification or reactants such as those disclosed in the ICI patents mentioned above. When using the DBEs and nonylphenols in accordance with the present invention there is no need for further addition of organo-silicon-containing compounds as disclosed in U.S. Pat. No. 3,884,848.

DETAILED DESCRIPTION OF THE INVENTION

Dibasic acid esters (DBE) having the formula

where $n = 2$, 3, or 4; and nonylphenol having the formula

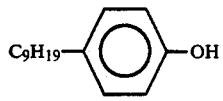

act as cell-opening additives in rigid polyurethane formulations. This formulation is useful in pour-behind-fabric (thermoplastic urethane laminated fabrics, vinyls, etc.) applications. In this type of application, it is important to allow trapped gases to diffuse through the rigid urethane foam substrate where if otherwise contained would reduce adhesion of the substrate to the fabric. The mixtures of DBEs and nonylphenols used in the present invention function as cell-opening agents allowing diffusion without compromising the adhesion at the substrate-fabric interface.

In low density SRIM applications, it is also important to maintain the low viscosity of the urethane reactants as the reacting chemical system flows through the reinforcement. Because of the low permeability of such reinforcements, low viscosity systems are desirable. DBEs are low viscosity materials which, when added to conventional or urethane/isocyanurate urethane systems, reduce viscosity and improve the flow of the resulting urethane system through the reinforcement.

According to the present invention, the reactive components comprise one or more polyisocyanates (A-side) and a resin (B-side) containing a polyol having isocyanate reactive groups. There is no particular qualification as to what reactive components are present; however, those that are present must be capable of reacting to form a cellular rigid polyurethane foam, a further condition being that the total system including the DBE, nonylphenol and other additives has a viscosity such that it may be used with reinforcing materials in pour-in-place-behind SRIM applications.

The polyisocyanates which may commonly be used as the A-side component are modified and unmodified polyisocyanates, which are well known to those skilled in the art. Unmodified polyisocyanates include aromatic and aliphatic polyisocyanates such as 2,4- and 2,6-toluene-diisocyanates, 2,4- and 2,6-methylcyclohexylenediisocyanate, isophoronediisocyanate, 2,4'-, 4,4'- and 2,2'-diphenylmethane-diisocyanates, and polyphenylenepolymethylenepolyisocyanates. Mixtures of the above isocyanates as well as crude polyisocyanates are useful.

Modified polyisocyanates may also be useful, particularly those isocyanates which have reduced viscosity. Examples of modified polyisocyanates include urethane, urea, biuret, and carbodiimide modified polyisocyanates. Such modified polyisocyanates are well known to those skilled in the art. Preferred isocyanates include the modified polyisocyanates, particularly carbodiimide modified 4,4'-diphenylmethane diisocyanate.

The isocyanate reactive polyols contained in the B-side resin are generally hydroxyl group-containing compounds (polyols) useful in the preparation of polyurethanes described in the *Polyurethane Handbook* in chapter 3, §3.1 pages 42–61; and in *Polyurethanes: Chemistry and Technology* in Chapter II, §§III and IV, pages 32–47. Many hydroxyl group-containing compounds may be used, including simple aliphatic glycols, dihydroxy aromatics, bisphenols, and hydroxyl-terminated polyethers, polyesters, and polyacetals, among others. Extensive lists of suitable polyols may be found in the above references and in many patents, for example, in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Preferably used are hydroxyl-terminated polyoxyalkylene. These compounds are generally prepared by well-known methods, for example, by the base catalyst addition of an alkylene oxide, preferably ethylene oxide (oxirane), propylene oxide (methyloxirane) or butylene oxide (ethyloxirane to an initiator molecule containing on the average two or more active hydrogens. Examples of preferred initiator molecules are dihydric initiators, such as ethylene glycol, propylene glycol, butylene glycol, neopentyl glycol, 1,6-hexanediol, hydroquinone, resorcinol, the bisphenols, aniline and other aromatic monoamines, aliphatic monoamines, and monoesters of glycerine; trihydric initiators, such as glycerine, trimethylolpropane, trimethylolethane, N-alkylphenylenediamines, mono-, di-, and trialkanolamines; tetrahydric initiators, such as ethylene diamine, propylenediamine, 2,4'-, 2,2'-, and 4,4'-methylenedianiline, toluenediamine, and pentaerythritol; pentahydric initiators, such as diethylenetriamine; and hexahydric and octahydric initiators, such as sorbitol and sucrose.

Addition of alkylene oxide to the initiator molecules may take place simultaneously or sequentially when more than one alkylene oxide is used, resulting in block, heteric, and block-heteric polyoxyalkylene polyethers. The number of hydroxyl groups will generally equal the number of active hydrogens in the initiator molecule. Processes for preparing such polyethers are described both in the *Polyurethane Handbook* and *Polyurethanes: Chemistry and Technology* as well as in many patents, for example, U.S. Pat. Nos. 1,922,451; 2,674,619; 1,922,459; 3,190,927; and 3,346,557.

Polyester polyols also represent examples of a hydroxyl group-containing compound useful in the preparation of polyurethanes. Such polyesters are well known in the art and are prepared simply by polymerizing polycarboxylic acids or their derivatives, for example, their acid chlorides or anhydrides, with a polyol. Numerous polycarboxylic acids are suitable, for example, malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example, the various aliphatic glycols, trimethylolpropane and trimethylolethane, a-methylglucoside, and sorbitol. Also suitable are low molecular weight polyoxyalkylene glycols, such as polyoxyethylene glycol, polyoxypropylene glycol, and block and heteric polyoxyethylene-polyoxypropylene glycols. These lists of dicarboxylic acids and polyols are illustrative only and not limiting. Although carboxyl groups are also reactive with isocyanates, an excess of polyol should be used to ensure hydroxyl termination. Methods of preparation of such polyester polyols are given in the *Polyurethane Handbook* and in *Polyurethanes: Chemistry and Technology*.

A plasticizer may also be used. It has been found that when epoxidized 2-ethylhexyl tallate is used in the formulation the overall effect of the cell-opening mixture seems to be enhanced, and the resulting articles have improved mold release characteristics.

In low density SRIM systems, i.e., SRIM systems having an unreinforced density less than that of water, a blowing agent is necessary. Water is the preferred blowing agent and may be used in amounts of up to about 4 weight percent of the polyol (B-side) component. The density of the foam decreases with increasing water content. When water is used as the blowing agent, the polyisocyanate component is increased proportionately. Calculating the amount of water required and isocyanate required are routinely performed by those skilled in the arts of polyurethane and polyisocyanurate foams.

Chlorofluorocarbons (CFCs) and other volatile organic compounds may also be used as blowing agents, either alone, or in conjunction with water. When used alone, CFC blowing agents and other halogenated organics such as methylene chloride are generally used in amounts up to about 30 weight percent of the polyol component, preferably from 15 to about 25 weight percent. Other volatile organic compounds such as pentane, isopentane, acetone, and other like, are used in correspondingly lesser amounts due to their lower molecular weights. When co-blown, the CFC-type blowing agents are utilized in lesser amounts, for example, up to about 20 weight percent of the polyol component.

Flame retardants may also be used when required by the formulation. Suitable flame retardants are well known to those skilled in the art, but the low molecular weight halogenated phosphate esters, polyhalogenated biphenyls and biphenyloxides and the like may be used when flame retardants are necessary. As the presence of such flame retardants generally causes a decrease in physical properties, use of flame retardants is not preferred.

Suitable catalysts include both urethane and isocyanurate reaction promoting catalysts and are well known to those skilled in the art of polyurethanes. In general, the presence of at least an effective amount of isocyanurate promoting catalyst is necessary. This catalyst may be purposefully added or may be present in the polyol by neutralization of the alkali metal polyoxyalkylation catalyst with a carboxylic acid. Preferred catalysts are tertiary amines advantageously utilized in a glycol solution, organotin catalyst and the salts of aliphatic carboxylic acids, e.g., potassium acetate in a glycol solution.

Further materials which may be present in the polyurethane foam forming composition include: fillers, pigments, such as carbon black, bacteriostats, crosslinkers, chain extenders, antioxidants and the like. Many such additives and auxiliary materials are discussed in the *Polyurethane Handbook*, chapter 3, §3.4, pages 90–109; and in *Polyurethanes: Chemistry and Technology*, Part II, Technology.

The dibasic esters of the present invention are aliphatic dibasic acid esters. Specifically, they are the refined dimethyl esters of adipic, glutaric and succinic acids. The dibasic acid esters used in the present invention are available commercially from DuPont. These dibasic acid esters are manufactured from a mixed acid stream obtained from DuPont's adipic acid plants. The primary refined ester product is designated DEE and has a typical ester content of about 17 percent dimethyl adipate, 66 percent dimethylglutarate and 16.5 percent dimethyl succinate. DuPont fractionates DBE into other mixtures and pure components. In addition to DBE, there are five fractions commercially available: DBE-2, DBE-3, DBE-4, DBE-5 and DBE-9. DBE, however, is the preferred ester in the present invention and is used at levels up to 5 weight percent, preferably at levels of from 2 weight percent to about 5 weight percent based on the total weight of the B-side component.

The nonylphenol used in the present invention is manufactured by the alkylation of phenol with an appropriate olefin. The resulting product is a clear liquid generally containing 96% to 97% nonylphenol with the remainder being minor amounts of reaction by-products. The nonylphenol may be used at levels of up to 15 weight percent based on the total weight of the B-side component. It is preferably used at levels of from 3 weight percent to 5 weight percent. The mixture of DBE/nonylphenol should not exceed 20 weight percent based on the total of the B-side resin.

The DBE/nonylphenol-containing polyurethane foam forming compositions of the present invention are used in conjunction with various reinforcement and may be used to produce the low density structurally reinforced reaction-injection-molded items in pour-behind molded applications.

Reinforcement suitable for use with SRIM is widely varied. Both woven and non-woven (random) reinforcement, or combinations thereof, may be used. Suitable fibers are synthetic fibers of nylon, polyester, aramid, polyetheretherketones, polyethersulfones, polyimides, and the like; natural fibers such as cotton, hemp, flax, jute; and mineral or ceramic fibers including Wollastonite alumina, glass fibers, and carbon fibers. Preferred fibrous reinforcement due to its low cost and physical properties is glass fiber, either woven or non-woven. A unique non-glass material is Colback ® spun-bonded nonwoven comprised of a bicomponent fiber having a polyester core and polyamide skin, available from BASF Corporation, Fibers Division, Parsippany, N.J.

One or more layers of fiber reinforcement may be used depending on the desired fiber weight. Up to 70 weight percent of the SRIM part may comprise glass fiber reinforcements.

In addition to layers of fibrous reinforcement, chopped fibers and other fillers may be added to the isocyanate side of the system, the polyol side, or both in amounts up to about 70 weight percent of the SRIM part. Both man-made reinforcement such as glass fiber, carbon fiber, silicon carbide fiber, ceramics and the like may be used, or natural reinforcement such as flaked mica, jute, cellulose fiber, among others.

In pour-behind applications, the fiber reinforcement and surfacing film or fabric, are laid into the mold. The mold may be shot with the intimately mixed A and B sides while open and then closed, or may be closed and shot. The heat of reaction causes volatile blowing agents to vaporize while water blown foams result from the reaction of water with the isocyanate. Following a reaction time of from several seconds to several minutes, the part is demolded. Generally, a mold release coating is necessary. External mold releases are well known to those skilled in the art. Examples of such include waxes and silicones. The surfacing film or fabric used in the molding process may include, but is not limited to, thermoplastic polyurethane laminated fabrics, vinyls, such as PVC vinyl, or woven fabric. An example of a preferred surfacing film is an expanded vinyl designated as J6 commercially available from Gen Corporation. Examples of some molded articles produced using the polyurethane of the present invention include sunshades, interior door panels and kick panels for use in automobiles.

Having thus described the invention, the following examples are meant as illustrations and should not be construed as limiting in nature. Resin components are given as weight percent. The amount of isocyanate is given in parts by weight per 100 parts resin.

Polyol A is a monoethanolamine initiated polyoxypropylene/ polyoxyethylene copolymer having a hydroxyl number of about 500 and a nominal molecular weight of 330.

Polyol B is a polyoxypropylene adduct of a sucrose/-glycerine mixed initiator having a hydroxyl number of about 490 and a nominal molecular weight of 500.

Plastolein 924 is an epoxidized 2-ethylhexyl tallate available from Emery Industries, Inc.

DABCO X-8154 is an acid blocked triethylenediamine in dipropylene glycol available from Air Products.

POLYCAT T-5 is an organotin catalyst available from Air Products.

Catalyst C is 40 weight percent potassium acetate dissolved in 60 weight percent dipropylene glycol.

DBE is a dimethyl ester mixture comprising about 17% dimethyladipate about 66% dimethyglutarate and about 16.5 dimethylsuccinate. It is commercially available from E.I. duPont de Nemours & Co., Inc.

Nonylphenol is a $C_9$ alkyl substituted phenol which is available commercially from Monsanto.

ISO is a carbodiimide modified 4,4'-diphenylmethane diisocyanate having an NCO content of about 29 weight percent. It is available commercially from BASF Corporation.

TABLE I

| Resin | 1 | 2 | 3 | 4 | 5 | 6 | 7 | 8 | 9 | 10 |
|---|---|---|---|---|---|---|---|---|---|---|
| Polyol A | 67.15 | 65.05 | 63.65 | 60.25 | 56.75 | 65.05 | 63.65 | 60.25 | 56.75 | 61.55 |
| Polyol B | 29.4 | 28.5 | 27.9 | 26.4 | 24.9 | 28.5 | 27.9 | 26.4 | 24.9 | 27.0 |
| Plastolein 9214 | 0 | 0 | 0 | 0 | 0 | 0 | 0 | 0 | 0 | 0 |

TABLE I-continued

| Resin | 1 | 2 | 3 | 4 | 5 | 6 | 7 | 8 | 9 | 10 |
|---|---|---|---|---|---|---|---|---|---|---|
| Water | 2.2 | 2.2 | 2.2 | 2.2 | 2.2 | 2.2 | 2.2 | 2.2 | 2.2 | 2.2 |
| DABCO X-8154 | 0.5 | 0.5 | 0.5 | 0.5 | 0.5 | 0.5 | 0.5 | 0.5 | 0.5 | 0.5 |
| POLYCAT T-5 | 0.05 | 0.05 | 0.05 | 0.05 | 0.05 | 0.05 | 0.05 | 0.05 | 0.05 | 0.05 |
| Catalyst C | 0.70 | 0.70 | 0.70 | 0.70 | 0.70 | 0.70 | 0.70 | 0.70 | 0.70 | 0.70 |
| DBE | 0 | 3 | 5 | 10 | 15 | 0 | 0 | 0 | 0 | 3 |
| Nonylphenol | 0 | 0 | 0 | 0 | 0 | 3 | 5 | 10 | 15 | 5 |
| ISO | 179 | 175 | 172 | 162 | 155 | 173 | 170 | 162 | 155 | 166 |
| Physical | | | | | | | | | | |
| Cream, sec. | 15 | 15 | 15 | 15 | 15 | 15 | 15 | 15 | 15 | 15 |
| Top of Cup, sec. | 20 | 20 | 20 | 20 | 20 | 20 | 20 | 20 | 20 | 20 |
| Rise, sec. | 40 | 40 | 40 | 40 | 40 | 40 | 40 | 40 | 40 | 40 |
| Odor | — | LOW | LOW | HIGH | HIGH | LOW | LOW | HIGH | HIGH | LOW |
| Bubbling | | | | | | | | | | |
| Largest Unbroken Cell on Surface (mm) | — | — | — | — | — | — | — | — | — | — |
| Largest Broken Cell on Surface (mm) | 5 | 4 | 3 | 2 | 1 | 4 | 3 | 3 | 3 | 2/3 |

TABLE II

| Resin | 1 | 2 | 3 | 4 | 5 | 6 | 7 | 8 | 9 | 10 |
|---|---|---|---|---|---|---|---|---|---|---|
| Polyol A | 62.65 | 60.55 | 59.15 | 55.75 | 52.25 | 60.55 | 59.15 | 55.75 | 52.25 | 57.05 |
| Polyol B | 27.4 | 26.5 | 25.9 | 24.4 | 22.9 | 26.5 | 25.9 | 24.4 | 22.9 | 25.0 |
| Plastolein 9214 | 6.5 | 6.5 | 6.5 | 6.5 | 6.5 | 6.5 | 6.5 | 6.5 | 6.5 | 6.5 |
| Water | 2.2 | 2.2 | 2.2 | 2.2 | 2.2 | 2.2 | 2.2 | 2.2 | 2.2 | 2.2 |
| DABCO X-8154 | 0.5 | 0.5 | 0.5 | 0.5 | 0.5 | 0.5 | 0.5 | 0.5 | 0.5 | 0.5 |
| POLYCAT T-5 | 0.05 | 0.05 | 0.05 | 0.05 | 0.05 | 0.05 | 0.05 | 0.05 | 0.05 | 0.05 |
| Catalyst C | 0.70 | 0.70 | 0.70 | 0.70 | 0.70 | 0.70 | 0.70 | 0.70 | 0.70 | 0.70 |
| DBE | 0 | 3 | 5 | 10 | 15 | 0 | 0 | 0 | 0 | 3 |
| Nonylphenol | 0 | 0 | 0 | 0 | 0 | 3 | 5 | 10 | 15 | 5 |
| ISO | 170 | 166 | 163 | 155 | 148 | 166 | 163 | 155 | 148 | 159 |
| Physical | | | | | | | | | | |
| Cream, sec. | 16 | 16 | 16 | 16 | 16 | 15 | 15 | 15 | 15 | 15 |
| Top of Cup, sec. | 24 | 24 | 24 | 24 | 24 | 24 | 24 | 24 | 24 | 24 |
| Rise, sec. | 40 | 40 | 40 | 40 | 40 | 40 | 40 | 40 | 40 | 40 |
| Odor | | Low | Low | High | High | Low | Low | High | High | Low |
| Bubbling | | | | | | | | | | |
| Largest Unbroken Cell on Surface (mm) | 4 | 1 | 0.5 | 0.5 | 0.5 | 2 | 2 | 1.5 | 1.5 | Too Fine to Measure |
| Largest Broken Cell on Surface (mm) | 5 | 5 | 2 | 2 | 2 | 5 | 2 | 4 | 6 | Too Fine To Measure |

Open pour cups were made with each formulation to determine its physical characteristics. All materials were at room temperature. The resin and iso were weighed into a one-quart ponderosa cup and mixed at about 1800 rpm for five seconds using a high speed motorized mixer equipped with a German mix blade. It should be noted that formulations having higher concentrations of DBE and nonylphenol individually had an objectionable odor; whereas, the formulation combining DBE and nonylphenol had an acceptable odor.

Samples 1-10 in Table I contained a plasticizer; whereas, samples 1-10 in Table II were unplasticized. The samples containing plasticizer exhibited slightly smoother surface characteristics than corresponding sample without plasticizer.

Plaques were made for all examples to test the formulations in pour-behind applications. For each plaque a cut to fit piece of PVC vinyl was placed in a room temperature 12"×12"×¼" mold. The vinyl was overlayed with a sheet of random fiber, fiberglass mat. A mixed, room temperature, 100-gram transfer of each formulation was poured into the mold. The mold was shut and clamped and the plaque allowed to cure. The plaques were demolded and subject to heat aging at 190° F. for a half-day. Adhesion was poorest in areas exhibiting roughness caused by large cells and became progressively better as the cell sizes were reduced and the surface became smoother.

Having thus described the invention, we claim:

1. A low density, open cell, rigid polyurethane, comprising:
   A. an organic isocyanate,
   B. a resin, comprising
      i. an isocyanate reactive hydroxyl containing compound selected from the group comprising, polyoxyalkylene polyether polyols, polyester polyols, and mixtures thereof,
      ii. a blowing agent consisting essentially of water,
      iii. an effective amount of a catalyst or mixture of catalysts capable of promoting urethane and/or isocyanurate linkages,
      iv. optionally, a plasticizer,
      v. optionally, fillers, pigments, crosslinkers, chain extenders, or antioxidants, and,
   C. a mixture of,
      i. up to 5 weight percent of a dibasic acid ester selected from a group comprising the dimethyl esters of adipic acid, glutaric acid, succinic acid, and mixtures thereof; and, ii. up to 15 weight percent of nonylphenol, wherein the weight percents are based on the total weight of the resin.

2. A rigid polyurethane as claimed in claim 1, wherein the organic isocyanate is a carbodiimide modified 4,4'- diphenylmethane diisocyanate.

3. A rigid polyurethane as claimed in claimed in claim 1, wherein the isocyanate reactive hydroxyl containing compound is a mixture of a polyoxyalkylene polyether polyols.

4. A rigid polyurethane as claimed in claim 1, wherein the catalyst is capable of promoting isocyanurate linkages.

5. A rigid polyurethane as claimed in claim 1, wherein the dibasic acid ester is a mixture of the dimethylesters of adipic acid, glutaric acid and succinic acid.

6. A rigid polyurethane as claimed in claim 1, wherein said plasticizer is an epoxized 2-ethylhexyl tallate.

7. A rigid polyurethane as claimed in claim 6, wherein the plasticizer is present in amounts of from 0 to about 6.5 weight percent based on the total weight of the resin component.

8. A rigid polyurethane as claimed in claim 1, wherein the dibasic acid ester is present in amounts of from 2 to about 5 weight percent, and the nonylphenol is present in amounts of from 3 to 5 weight percent based on the total weight of the resin.

9. A rigid polyurethane as claimed in claim 1, wherein the dibasic acid ester is present in 3 weight percent, and the nonylphenol is present in 5 weight percent based on the total weight of the resin.

10. A low density SRIM article comprising a facing film, fibrous reinforcement, and a low density, open celled, rigid polyurethane, wherein the rigid polyurethane comprises the composition of claim 1.

* * * * *